United States Patent
Vlahos et al.

(10) Patent No.: US 9,288,462 B2
(45) Date of Patent: Mar. 15, 2016

(54) CONVERSION OF AN IMAGE TO A TRANSPARENCY RETAINING READABILITY AND CLARITY OF DETAIL WHILE AUTOMATICALLY MAINTAINING COLOR INFORMATION OF BROAD AREAS

(71) Applicant: iMatte, Inc., Chatsworth, CA (US)

(72) Inventors: Paul E. Vlahos, Tarzana, CA (US); Arie Berman, Chatsworth, CA (US)

(73) Assignee: IMATTE, INC., Chatsworth, CA (US)

( * ) Notice: Subject to any disclaimer, the term of this patent is extended or adjusted under 35 U.S.C. 154(b) by 127 days.

(21) Appl. No.: 14/020,651

(22) Filed: Sep. 6, 2013

(65) Prior Publication Data
US 2015/0071531 A1    Mar. 12, 2015

(51) Int. Cl.
*G06K 9/00* (2006.01)
*H04N 9/75* (2006.01)

(52) U.S. Cl.
CPC ..................................... *H04N 9/75* (2013.01)

(58) Field of Classification Search
None
See application file for complete search history.

(56) References Cited

U.S. PATENT DOCUMENTS

| | | | |
|---|---|---|---|
| 4,344,085 A | 8/1982 | Vlahos | |
| 5,896,136 A * | 4/1999 | Augustine et al. | 345/605 |
| 6,134,345 A * | 10/2000 | Berman et al. | 382/162 |
| 6,134,346 A * | 10/2000 | Berman et al. | 382/163 |
| 6,377,269 B1 * | 4/2002 | Kay et al. | 345/589 |
| 7,826,668 B1 * | 11/2010 | Zaklika et al. | 382/224 |
| 2002/0047933 A1 * | 4/2002 | Vlahos et al. | 348/627 |
| 2004/0042654 A1 * | 3/2004 | Sevigny | 382/167 |
| 2004/0160581 A1 | 8/2004 | Parker et al. | |
| 2005/0089216 A1 * | 4/2005 | Schiller et al. | 382/159 |
| 2005/0246145 A1 * | 11/2005 | Zhu | 703/2 |
| 2007/0019882 A1 * | 1/2007 | Tanaka et al. | 382/276 |
| 2012/0121175 A1 * | 5/2012 | Narayanan et al. | 382/166 |
| 2013/0215143 A1 | 8/2013 | Pettigrew et al. | |

OTHER PUBLICATIONS

Hillman, P.; Hannah, J.; Renshaw, D., "Alpha channel estimation in high resolution images and image sequences," Computer Vision and Pattern Recognition, 2001. CVPR 2001. Proceedings of the 2001 IEEE Computer Society Conference on , vol. 1, No., pp. I-1063,I-1068 vol. 1, 2001.*

PCT International Search Report mailed Jan. 29, 2015 in connection with PCT/US2014/054328, International Filing Date: Sep. 5, 2014, 14 pp.

* cited by examiner

*Primary Examiner* — Andrae S Allison
(74) *Attorney, Agent, or Firm* — Blakely Sokoloff Taylor & Zafman LLP

(57) ABSTRACT

The present invention converts an image into a transparency, or "foreground image", on which the readability of text and other detail is preserved after compositing with a background, while maintaining color information of broad areas of the image.

10 Claims, 3 Drawing Sheets

1. Value Variations over FG pixels

2. Low pass filter of data in 1. (using simple average)

3. Absolute difference between 1. and 2.

Pixel Value/Color 1. (Same as FIGURE 1)

Pixel Position

2. Gaussian low pass filter of data in 1

3. Derivative of data in 2; an alternative edge estimation.

CONVERSION OF AN IMAGE TO A TRANSPARENCY RETAINING READABILITY AND CLARITY OF DETAIL WHILE AUTOMATICALLY MAINTAINING COLOR INFORMATION OF BROAD AREAS

BACKGROUND OF THE INVENTION

In long distance learning, presentation material is displayed on a screen or board, and the presenter stands to the side or at times in front of the board or screen, talking about the subject and pointing to illustrations or text on the screen that would enhance the effectiveness of his presentation. In order to encode and transmit a visual of his lecture to a distant location, the presentation material is sent electronically, preferably from its original digital source if available, rather than a likely degraded "second generation" image from a camera capturing the original presentation screen. However, it is also desired that the presenter be shown as well, so as to make the material more relatable on a human level, through his gestures, social cues, and real time reaction to the material, and to the audience, bringing the lecture to life.

At the remote distant location, the presenter is shown along with the presentation material. This is typically done by displaying the presentation material on part of, or all of, the receiver's screen, with the presenter in a separate frame or "window", typically displayed on a corner of the screen. The presenter can also be composited over the presentation material to appear to be standing in front of it. The compositing of a foreground over a background has many methods of implementation. Foreground elements are isolated from an image so that what surrounded that element is replaced by the background image. Foregrounds elements will typically have both opaque and transparent areas that need to be identified and preserved in the finished composite.

Numerous techniques have been developed to facilitate compositing. Blue screen and green screen, front projection retro-reflective photography, sodium light, infra-red, ultra violet, chroma-key, stereo pair images, depth keys, difference keys and many other matte extraction techniques are well known and employed every day.

The present invention provides an improved method to integrate the presenter with his presentation material by using the presentation image as the foreground with both opaque areas and transparent areas through which the presenter can be seen as though standing behind it, and do this in a way that does not obscure nor degrade the readability of the text or other detail shown in the presentation material. In addition, any video source, either live or recorded, can be shown as the background instead of the presenter. These can be, for example, live images of the participants, collectively, like in a classroom, or individually, or of another presenter whose image is received from a distant location. If the graphics foreground layer is composited over the distant participant, it can be sent back to the participant so he can see himself behind the graphics facilitating his interaction.

SUMMARY OF THE INVENTION

The present invention converts an image into a variable density transparency, or "foreground image with matte", on which the readability of text and other detail is preserved after compositing with a background, and which allows the background to be seen through areas in the foreground while maintaining some of the color of the foreground areas.

The Problem:

Normally, a simple blending by some proportion of dissolve of two images can cause confusion when observing the details in each. It is not always clear which detail belongs with which image. Employing a chroma key or "color range" compositing technique to place graphics over a background image avoids background detail from showing through the foreground subject, reducing some of this confusion for the solid graphics areas which are a single color or smoothly varying colors, because the background detail is not visible at all in these areas. But this is also a problem in that these areas might cover parts of the background that should preferably be visible to effect better integration of the foreground and background, e.g. of the presentation material and the presenter.

The readability of small detail such as text on the foreground image also depends on this detail contrasting against its background. For example, black text will disappear if composited over a black background. It is therefore necessary to provide a means to maintain this essential contrast in the composite if we are to maintain readability of the text in the composite. The process described in the sequel will maintain this contrast, making the text and detail more readable and clear while allowing more of the background to show through the single color or smoothly varying colors areas of the foreground. It will also maintain a predetermined level of color of these single color or smoothly varying colors areas.

Forming the Transparency:

The conversion of an image to a transparency or "foreground image with matte" is done by forming a "matte", or map of transparency levels distributed over the image pixels. Thus, in this disclosure, the term "matte" represents transparency levels. This map is typically represented by a monochromatic image. By convention, the complement of this transparency matte, which would be an opacity map, is often incorporated into the image as an additional image channel, called the "alpha" channel, in addition to the usual color channels, such as the red, green, and blue component channels for an RGB color image.

In the present invention, the matte levels are determined by the "edge" or "edginess" level of each pixel in the foreground image. These are scalar values obtained from an edge evaluator such as a derivative, laplacian, or similar filter convolved with the foreground image. Note that some of these filters would ascribe edginess to pixels in the neighborhood of the peak edge, decreasing with distance from that edge. See FIGS. 2 and 3. The edge evaluator can also consider normalizing these scalar values by values in the edge's neighborhood, to obtain detection based on ratio of values, rather than just based on value differences.

In forming the matte, greater edginess is interpreted as low transparency, and lack of edginess is interpreted as high transparency. In other words, continuous smooth (i.e, a single color or smoothly varying colors areas) regions of the foreground become (at least partially) transparent, and edges such as text or other detail become opaque to the background; the level of edginess and the level of transparency are inversely related, and the matte level, i.e. the transparency level of each pixel, can range from 0.0 (fully opaque) to 1.0 (fully transparent). To allow some of the foreground color to be visible even in smooth areas of the foreground, the matte level, or level of transparency, can be limited to some preselected maximum.

Compositing:

With the matte determined, the compositing process is well known: The composite color can be computed as a weighted average of the background pixel color and the corresponding foreground pixel color. The matte or transparency level is used as the weight, or modulation, of the background color, and its complement as the weight or modulation on the corresponding foreground pixel color. In the distance learning or conferencing application described above, the background would typically consist of a live presenter image received from a distant location.

Retaining Readability:

Since the edge is clear and readable in the foreground image, retaining the foreground pixel colors in the neighborhood of the edge would retain this readability in the composite. Therefore readability in the composite would be enhanced if the matte indicates at least some level of opacity in the neighborhood of a strong edge, an edge indicated by a zero matte level. This can be achieved by expanding the zero-matte areas by a few pixels, or blurring the matte. Since blurring the matte would reduce the opacity (edginess) at an edge, the matte or its complement can be scaled to retain the original matte level at the edge. Alternatively, an edge evaluator that indicates some level of "edginess" for pixels surrounding the edge would also attain the same effect. Parameters used by such an edge evaluator can determine the size of the neighborhood affected, much like the blurring window size when blurring.

Using Existing Compositing Methods:

By compositing the transparency formed using the method of this invention over a blank green-screen, the foreground image is seen as though being in front of a green-screen and can be used as such to composite with other backgrounds using existing green-screen compositing methods."

DETAILED DESCRIPTION OF THE INVENTION

The invention is directed to forming a matte in a prescribed manner and using this matte to composite the foreground over the background.

In the preferred embodiment, the matte is formed as follows.

1. Blur a copy of the foreground image horizontally using a selected blur window length.

2. Blur the result vertically using a selected blur window length.

3. Compute the color or brightness difference between each foreground pixel and the corresponding pixel in the blurred image.

4. Compute the magnitude or absolute value of this difference for each pixel.

5. Determine or select a threshold on this magnitude, above which an edge is to be considered definite.

6. Divide this magnitude by the threshold, resulting in a value range from 0.0 to 1.0.

7. Clip resulting values that are greater than 1.0, to 1.0.

8. Compute the complement of the result for each pixel. This is the matte or transparency level for each pixel.

9. Multiply the matte computed to this point by a scale factor. This results in limiting the level of transparency over the entire foreground, permitting non-edge parts of the foreground to be visible at a level indicated by that scale factor.

With the matte determined, a composite can be formed as a weighted average of a background and the foreground image, with the matte as the weight or modulation of the background, and its complement as the weight or modulation of the foreground.

This method uses two main parameters: blur window length, and a threshold or scaling factor. The blur window length can be used for both horizontal and vertical blurring.

Otherwise, this parameter can be replaced by two parameters: one for horizontal blurring and the other for vertical.

An additional optional adjustment is to set a maximum transparency level, indicating the maximum transparency permitted for each pixel. This allows more of the foreground colors to show even in smooth areas without edges. This additional optional adjustment can be implemented simply by multiplying the matte by the factor indicated by the adjustment, the factor ranging from 0.0 to 1.0 inclusive.

Figure 1:
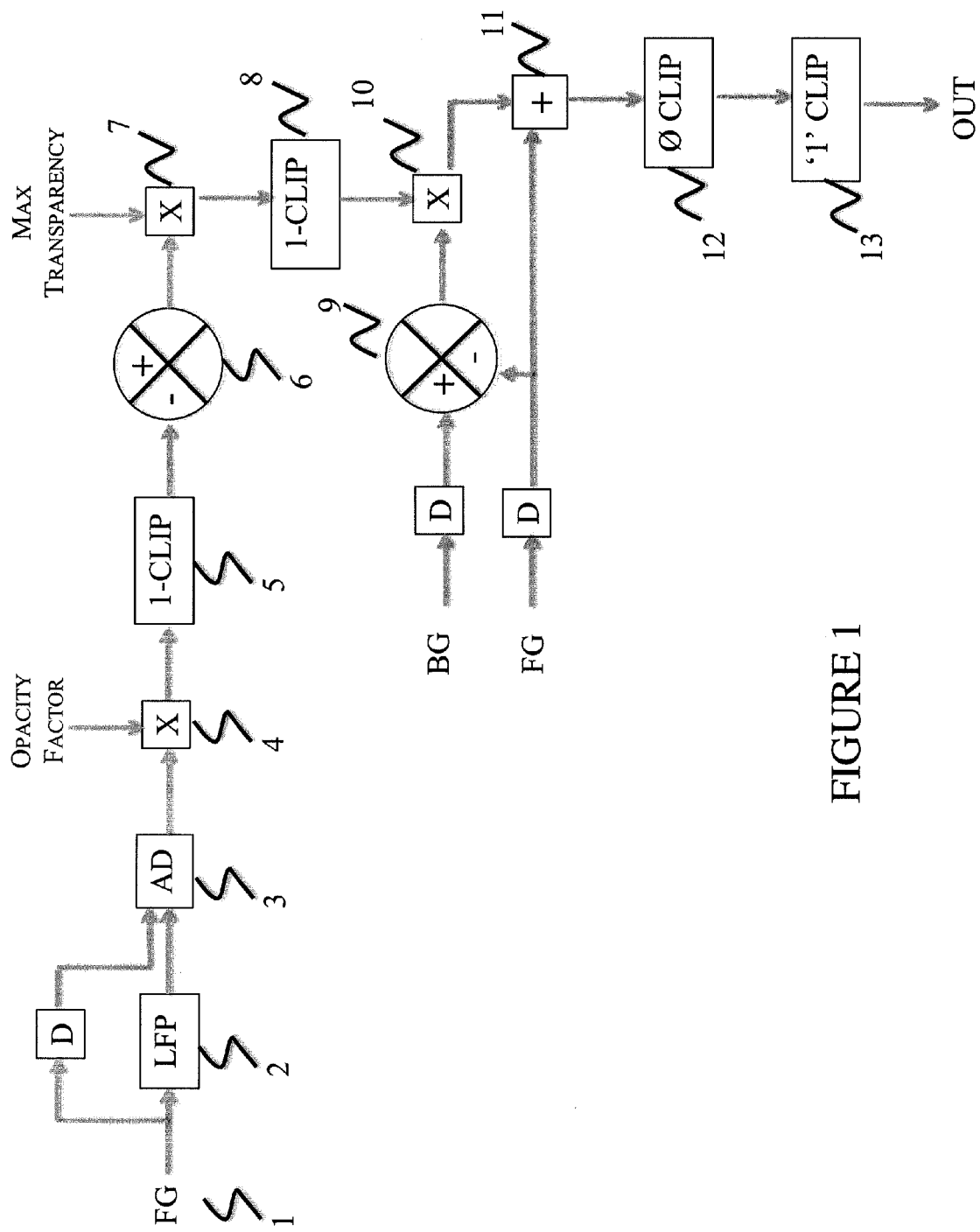
FIG. 1 is a block diagram of the preferred implementation of the invention.

The method described in this invention can be implemented as a software application in a general purpose computer, or as hardware/software combination, using FPGA devices, GPU devices or other dedicated image processing devices. FIG. 1 illustrates a preferred embodiment of a hardware/software processing apparatus, diagraming the process as follows:

The presentation or foreground image FG 1 is passed through a low pass filter LPF 2. The absolute difference or magnitude of the difference between the original foreground FG and the filtered version is computed in the AD block 3. This difference is then multiplied by an input scaling factor OP 4 to convert the range of this absolute difference to an opacity range in which 0 represents no opacity (total transparency) and 1.0 represents complete opacity (zero transparency). The opacity level is then clipped 5 so that any levels above 1.0 are replaced by 1.0. The opacity levels are then converted to transparency levels by complementing 6 the opacity (subtracting from 1.0). The result is then multiplied by an input transparency factor TR 7, with the effect of limiting the transparency to not exceed TR. The result is then clipped 8 at 1.0. This clipped result is the matte, which provides scalar values (is monochromatic) ranging from 0.0 to 1.0 and representing transparency levels for each pixel in which 0 represents complete opacity (zero transparency) and 1.0 represents complete transparency (total transparency).

The scaling factor OP 5 is user determined based on whether the user wants the edges to reach full opacity, whereas the scaling factor TR 7 is user determined based on whether the user wants the smooth areas with no edges to be fully or only partially transparent—that is, fully background, or some mix with the foreground color.

In general, it would be preferred that the text and lines as in line drawings should be fully opaque, and the user would determine the values to use by observation, but other methods could be employed based on the method of estimating edge levels, and the distribution of pixel values and value variations expected for the material being presented.

Also, this adjustment need not be made separately for each image—it could (and generally would) be fixed after an initial adjustment, generally based on observation/experimentation, e.g., when the system is setup, to accommodate the material generally presented.

The original foreground image FG 1 is then subtracted from an input background image BG 9 and multiplied 10 by the matte produced by the process described in the previous paragraphs. This product is then added 11 to the original foreground FG, and the value range clipped by clip blocks 12 and 13 to remain within a valid color range, forming the final composite.

Note that the D blocks represent delays for synchronizing the timing between the different signal paths. Also, the above mentioned range [0.0,1.0] is represented in the apparatus by a suitable integer range. For example, for data apparatus using 10 bit data, the range between 0.0 and 1.0 is represented by the range of integers from 0 to 1023.

Figure 2:
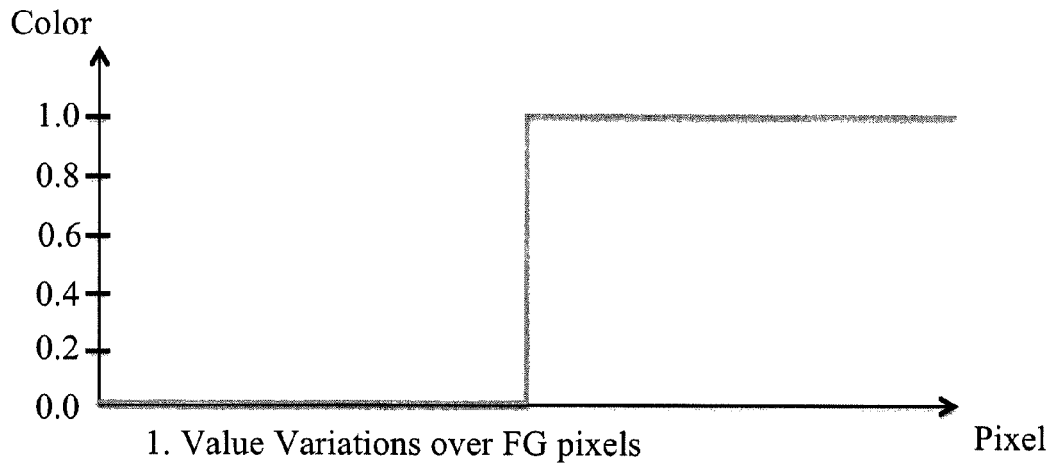
FIG. 2 illustrates the edge or opacity computation of the preferred embodiment, showing gradual reduction of opacity with distance from the peak edge.
Figure 2:
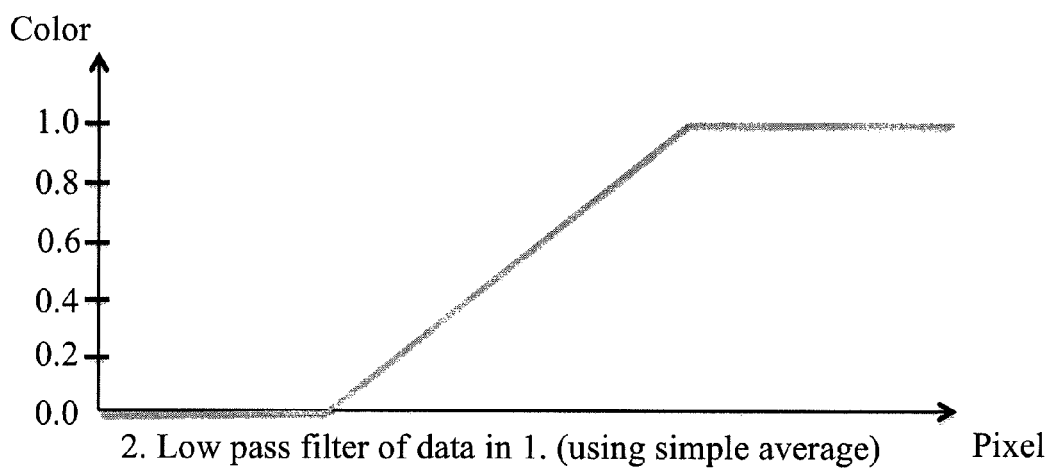
Figure 2:
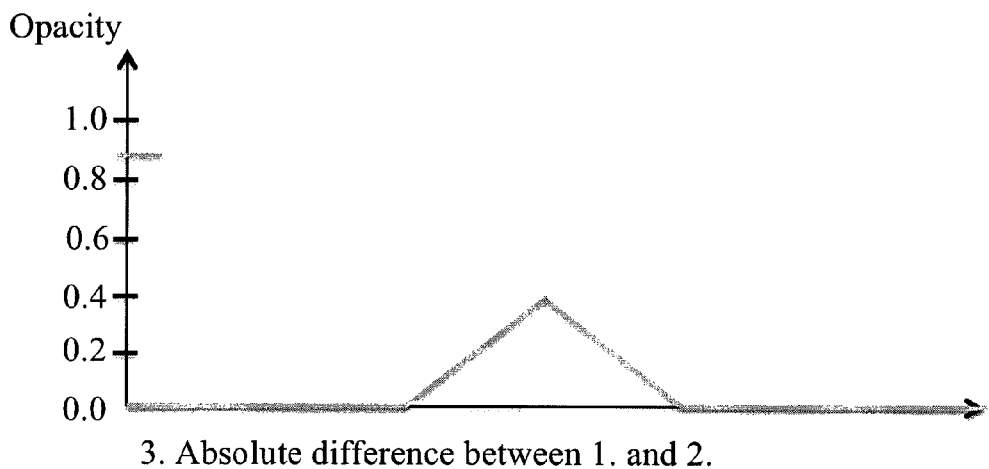
Figure 3:
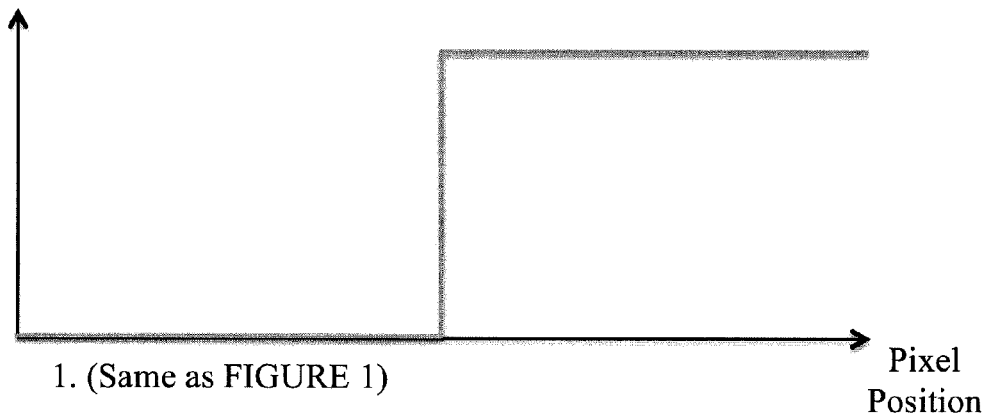
FIG. 3 illustrates the edge or opacity computation of the preferred embodiment, showing gradual reduction of opacity with distance from the peak edge, but using a more sophisticated low pass filter.
Figure 3:
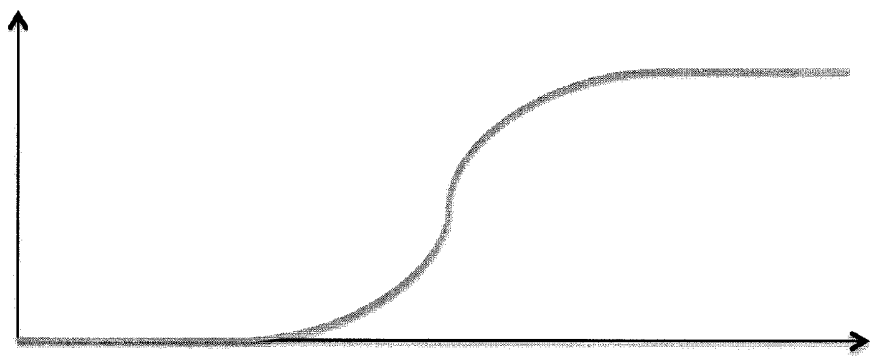
Figure 3:
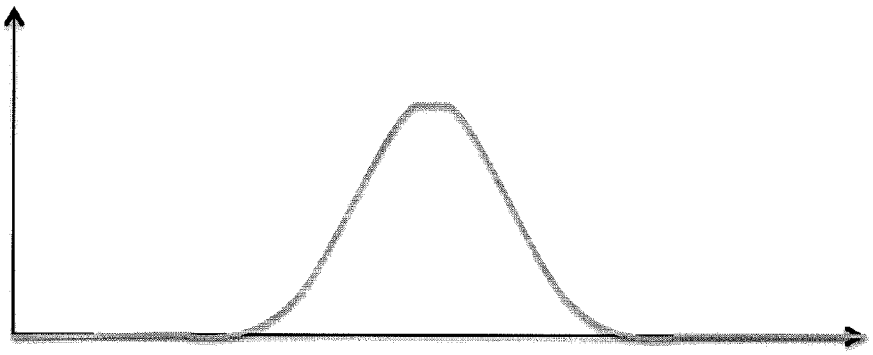

Referring now to FIGS. 2 and 3, that if the blur (low pass filter 2) in steps one and two uses simple neighborhood averaging, the opacity would decrease to transparency linearly with distance from the peak edge as shown in FIG. 2. But if the blur uses weighted averaging like a Gaussian blur, the transition from opacity to transparency around an edge would be more graceful as shown in FIG. 3. In this connection, graphs 1, 2 and 3 in FIGS. 2 and 3 correspond to elements in FIG. 1 as follows: the signal FG 1, the output from low pass filter 2 and the output from absolute difference block 3, respectively.

Graph 1 shows a step function representing value variations over FG pixels in the neighborhood of an "edge" pixel. The value range used is [0.0,1.0].

Graph 2 shows the result of a simple low pass filter (averaging the neighborhood pixels), which results in a linear ramp from 0 to 1, centered at the above mentioned edge pixel.

Graph 3 shows the absolute difference between the original (step function) and the low pass filtered version, forming a pyramid, with a peak at the original edge pixel, reaching a level of 0.5.

We claim:

1. A method for converting an image into a transparency, or foreground image with matte for compositing with a background image, comprising:
   a) determining an edge level for each pixel in a foreground image,
   b) interpreting the determined edge levels as opacity levels for pixels of the foreground image, said opacity levels ranging from fully transparent at a first edge level, to fully opaque at a second edge level, to form a matte and a foreground transparency, wherein said first edge level is less than said second edge level; and
   c) compositing said foreground transparency with said background image, wherein said interpreting of the determined edge levels as said opacity levels is performed to preserve the readability of text and other detail in said foreground image after said compositing.

2. A method according to claim 1, in which said interpreting includes determining a threshold on the edge levels, above which an edge level is interpreted as completely opaque.

3. A method according to claim 2, in which the edge level for each pixel is calculated by dividing the edge levels by the determined threshold, and clipping the resulting levels above 1.0 to 1.0 to create an opacity matte, whose complement is a transparency matte.

4. A method according to claim 3 in which the opacity level is limited to a maximum level by scaling the transparency matte to a maximum level ranging between 0.0 and 1.0.

5. A method according to claim 1, in which the determining an edge level comprises computing at least one of:
   a) a difference,
   b) a normalized difference and
   c) a ratio between the foreground color of a pixel, and the color of the corresponding pixel in a low pass filtered version of the foreground pixel.

6. A method according to claim 1, in which the determining an edge level comprises computing at least one of:
   a) a difference,
   b) a normalized difference, and
   c) a ratio between the foreground color of a pixel, and the color of the corresponding pixel in a low pass filtered version of the foreground pixel as at least one of the foreground and low pass filtered foreground color value changes.

7. A method according to claim 1 in which the opacity level is limited by a predetermined maximum level.

8. A method according to claim 1 in which a distribution of said opacity levels over the foreground image pixels is blurred.

9. A method according to claim 1 in which a distribution of said opacity levels over the foreground image pixels is rescaled.

10. A system for converting an image into a transparency, or foreground image with matte, on which the readability of text and other detail is preserved after compositing over a background image, comprising:
    a) a low pass filter unit configured to receive a foreground image signal;
    b) an absolute difference unit coupled to said low pass filter unit and configured to receive said foreground image signal and a low pass filtered version of said foreground image signal and to calculate an absolute difference between said foreground image signal and said low pass filtered version of said foreground image signal;
    c) a multiplier coupled to said absolute difference unit configured to receive said absolute difference and multiply said absolute difference by an opacity scaling factor to convert said absolute difference to an opacity level between 0 and a number greater than wherein 0 represents complete transparency and 1 represents complete opacity;
    d) a clip unit coupled to said multiplier to replace said opacity level if greater than 1 to an opacity level equal to 1;
    e) a complementing unit coupled to said clip unit to calculate a complement to said opacity level output by said clip unit;
    f) a second multiplier coupled to said complementing unit configured to receive said complemented opacity level and multiply said complemented opacity level by a transparency scaling factor to convert said complemented opacity level to a transparency level between 0 and a number greater than wherein 0 represents complete opacity and 1 represents complete transparency;
    g) a second clip unit coupled to said second multiplier to replace said transparency level if greater than 1 to a transparency level equal to 1 to generate a transparency matte signal;
    h) a difference unit configured to receive said foreground image signal and a background image signal and calculate a difference between said background image signal and said foreground image signal;
    i) a third multiplier coupled to said second clip unit and said difference unit and configured to multiply said calculated difference by said transparency matte signal to generate a product signal;
    j) an adder unit coupled to said third multiplier and configured to receive said foreground signal and add said foreground signal to said product signal to generate a composite signal having a red component level, a green component level and a blue component level;
    k) a third clip unit coupled to said adder unit to convert each of said red component level, said green component level and said blue component level if less than 0 to 0; and l) a fourth clip unit coupled to said third clip unit to replace each of said red component level, said green component level and said blue component level if greater than a predetermined maximum value with said predetermined maximum value.

\* \* \* \* \*